C. E. AKELEY.
FILM MAGAZINE FOR MOTION PICTURE CAMERAS.
APPLICATION FILED MAY 20, 1918. RENEWED MAR. 27, 1919.
1,315,650.
Patented Sept. 9, 1919.
3 SHEETS—SHEET 1.
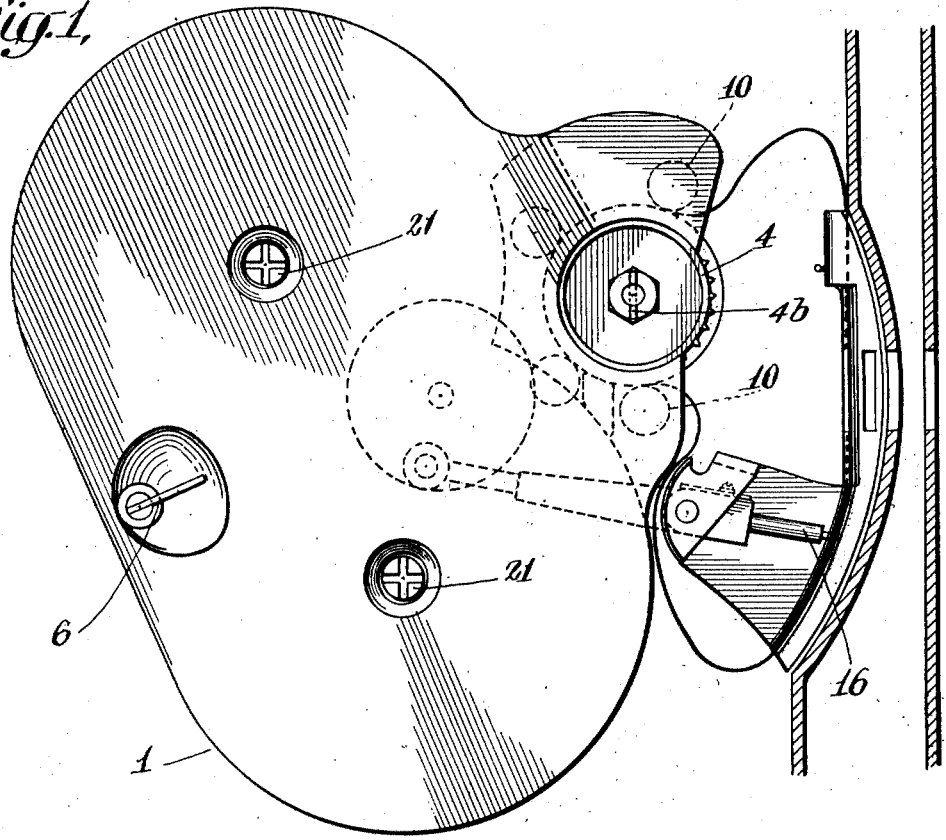
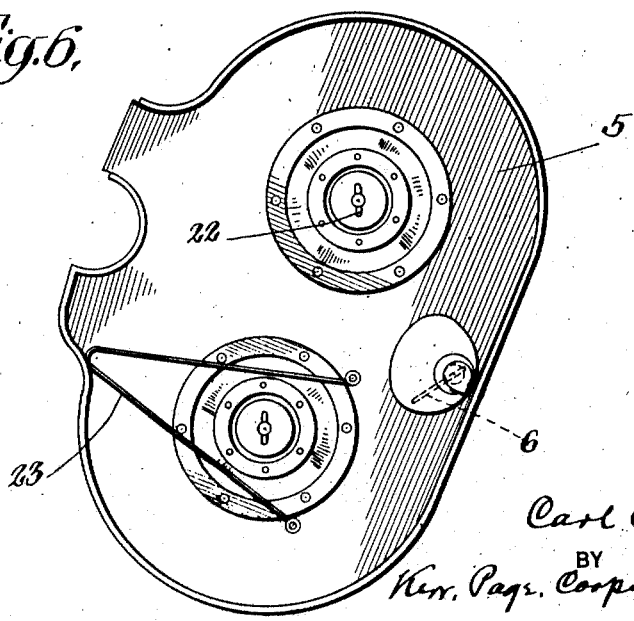
INVENTOR
Carl E. Akeley
BY
Kerr, Page, Cooper & Hayward
ATTORNEY

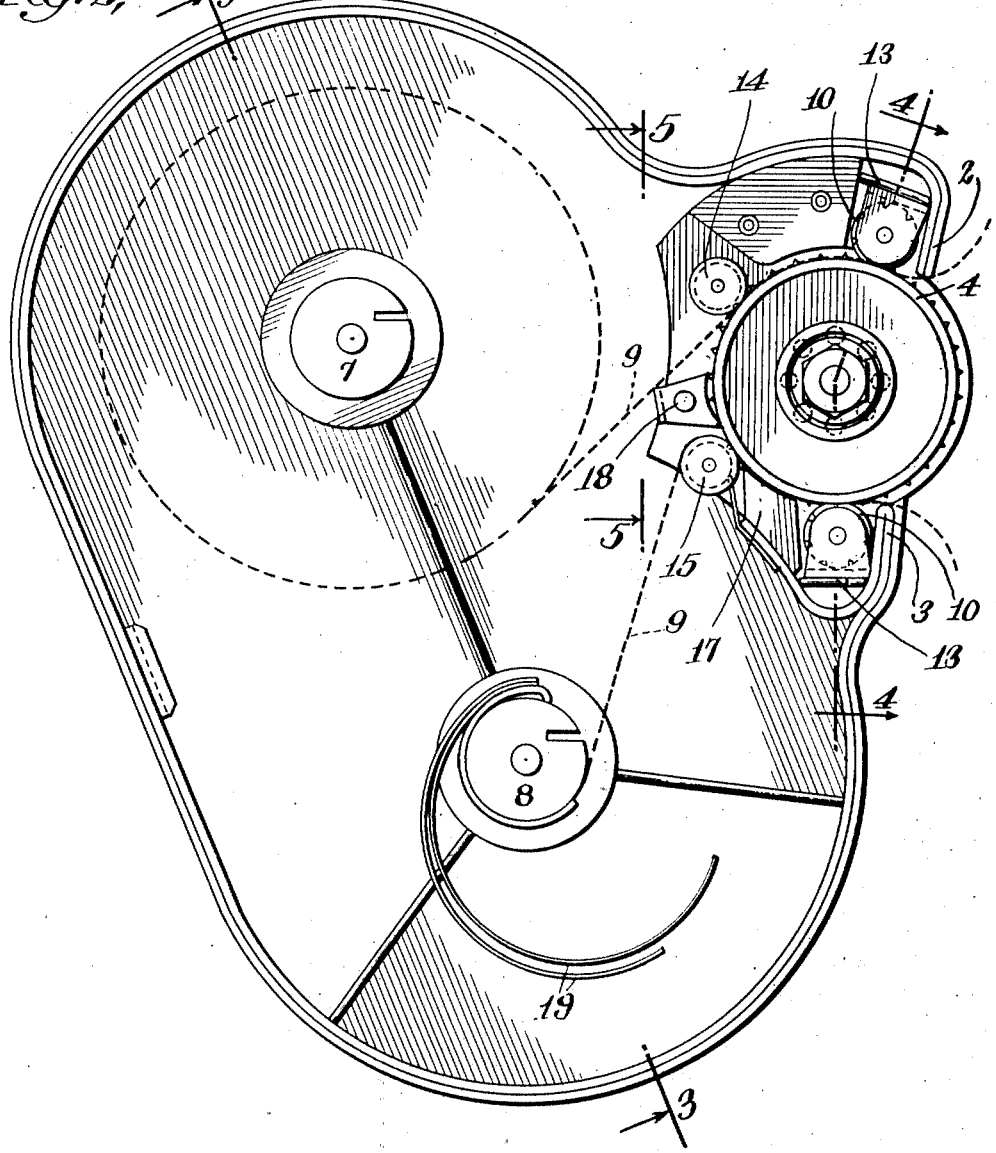

C. E. AKELEY.
FILM MAGAZINE FOR MOTION PICTURE CAMERAS.
APPLICATION FILED MAY 20, 1918. RENEWED MAR. 27, 1919.
1,315,650.
Patented Sept. 9, 1919.
3 SHEETS—SHEET 3.
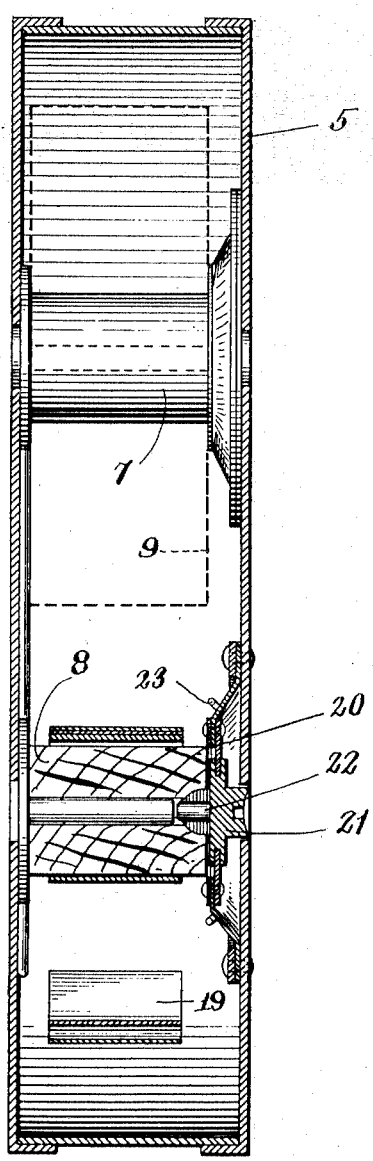
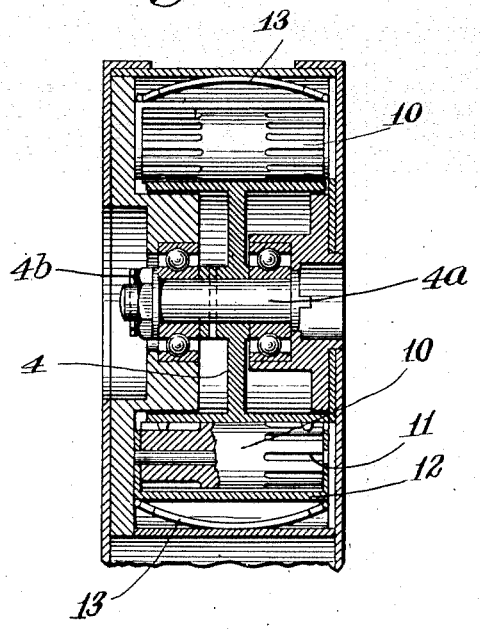
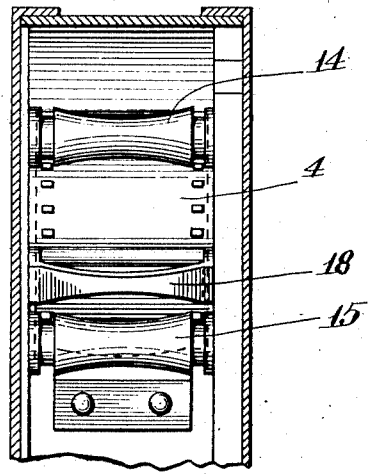
INVENTOR
Carl E. Akeley
BY
Kerr, Page, Cooper & Hayward
ATTORNEY

UNITED STATES PATENT OFFICE.

CARL E. AKELEY, OF NEW YORK, N. Y., ASSIGNOR TO AKELEY CAMERA, INC., OF NEW YORK, N. Y., A CORPORATION.

FILM-MAGAZINE FOR MOTION-PICTURE CAMERAS.

1,315,650.  Specification of Letters Patent.  Patented Sept. 9, 1919.

Application filed May 20, 1918, Serial No. 235,523. Renewed March 27, 1919. Serial No. 285,649.

*To all whom it may concern:*

Be it known that I, CARL E. AKELEY, citizen of the United States, residing at New York city, county and State of New York, have invented certain new and useful Improvements in Film-Magazines for Motion-Picture Cameras, of which the following is a full, clear, and exact description.

The ordinary motion picture camera is designed and constructed for use in studios, or under such conditions as there obtain, and which allow ample time and opportunity for inserting unexposed or replacing exposed films and such other manipulations of the instrument as their ordinary use may require. Other and more exacting conditions of use may, however, be encountered in practice such as field and war work, the securing of pictures from the trenches and the like, where every adjustment and every operation of the device must be accomplished with the least possible trouble and delay, and where perfect practicability and readiness of manipulation are essential and controlling considerations.

So far as I am aware, the exactions of such conditions of use have not heretofore been fully realized or provided for, and confronted by them in the special line of work in which I have been engaged, I have found it necessary to completely redesign the ordinary cameras, and to devise new and special forms and parts adapted for trench or war work in general. The device which forms the subject of this application is a film magazine for my new camera, which while generally useful and applicable to all motion picture cameras is especially designed and valuable for cameras of the particular class or kind above referred to.

The invention embodied in the device in question is limited in scope in this regard, that it accomplishes a known result, but this it does by new and improved instrumentalities and in a better and more effective way, and hence may be best understood by the somewhat specific statement of its nature and purpose which the conventional form of specification contains.

I therefore refer to the accompanying drawings for such description.

Figure 1 is an outside or elevation view of the film magazine or reservoir, in its normal position with relation to the film exposing mechanism.

Fig. 2 is a similar view but with the side or cover removed to show the interior mechanism.

Fig. 3 is a cross-sectional view of the magazine on line 3—3 of Fig. 2.

Fig. 4 is a detail cross-section on the line 4—4 of Fig. 2.

Fig. 5 is a detailed sectional view on line 5—5 of Fig. 2, and

Fig. 6 is a view of the inner side of the top cover or side of the magazine.

The film box or magazine 1, is of suitable shape for the film spools, sprocket and other devices, and is substantially flat; composed of sheet metal and made readily attachable to and detachable from the camera. It is closed on all sides except at the front which has an opening between two projecting portions 2 and 3 which exposes a portion of the film sprocket.

The side or cover 5 is removable and when attached is secured by a suitable locking device or catch 6. As shown in Fig. 2 the rear or wider portion of the box contains a spindle 7 for the roll of unexposed film, and a spool or spindle 8 for the film after exposure. In the forward portion is the spindle 4ª of the feed sprocket 4, which is mounted in anti-friction bearings and provided at its upper or free end with a pin or similar device 4ᵇ for engagement with any suitable turning means when the box is inserted in the camera so as to receive motion therefrom.

In the projections 2 and 3 are mounted rolls 10, 10, which bear upon the periphery of the sprocket wheel 4. The end portions of these rolls, as shown in Fig. 4, contain longitudinal grooves 11, which virtually form sprocket teeth and engage with those of the sprocket, so that when the latter is rotated these rolls also turn. The function of these rolls is to hold the film closely to the surface of the sprocket wheel 4 and by reason of the grooves or teeth therein, to form a light tight closure for the magazine box or case. The sprocket wheel moreover is inclosed by the supports for its spindle to exclude light elsewhere and this may be done in any proper manner for example as shown in Fig. 4. This complete exclusion of light is an important consideration and forms a perfect safeguard at all times against exposure of the sensitized film while in magazines or retorts carried as extras.

Before the magazine is closed in the dark room a loaded film roll or spool is slipped over the spindle 7, and the loose end 9 is then passed between an idler 14 and the sprocket and then between upper roller 10 and the sprocket. To permit this the roll 10 is drawn back out of engagement with the sprocket, it being carried by a box 12, forced by a bent spring 13 toward the sprocket. The film is then passed between the lower roll 10 and the sprocket, this roll being also supported and held against the sprocket by the same means as the upper roll. The film is then carried over an idler 15 and between it and the sprocket and finally secured to the wind up spool or spindle 8 as by means of a spring 19 which is secured thereto. The idlers 14 and 15 are preferably made with their peripheral surfaces of smaller diameter at the center so as not to contact with the film.

In threading or placing the film in the manner described a sufficient amount should be left between the two rolls 10 to form a loop as indicated in Fig. 1, and after this has been done the cover 5 is replaced on the magazine 1, which is thus loaded, rendered light tight and ready for insertion into a camera.

It will be understood, and for the reason that this is a mode of operation common in practically all cameras, it is not illustrated in detail, that the film feeding sprocket 4 is rotated continuously during the operation of the instrument to draw film from the supply spool. That this film may be properly exposed, when the magazine or retort, as it is often called, is placed in the camera, the loop of film between rolls 10 is laid when the magazine is put in place, in the gate or passage across the field of exposure, where it will be engaged and intermittently fed by the oscillating and reciprocating pin 16 or any other suitable feed device and delivered to the winding spool 8, at the same rate that it is drawn off from the supply spool. The winding spool is rotated continuously at the proper rate for this purpose.

To facilitate the above described features and operations certain details are required which may now be described. To assist in directing the film properly, when its end is threaded through the continuous feed drive a block 17 is secured in the magazine between the lower roll 10 and the idler 15. To prevent the end of the film from passing upward from this block to roll 14, a stop 18 is pivoted in the magazine immediately above the idler 15, which will be encountered by the film and turned to close the passage along the surface of the sprocket 4.

Again, when the film is run off from the supply spool and begins to be taken up by the winding spool, the diameter of this latter, without special provision to the contrary, would be too small to take up the film at a sufficiently rapid rate. This I avoid by attaching to the winding spool a flat bent spring or springs 19, which receive upon them the film and constitute a winding surface of substantially greater diameter than the spool itself. As the film accumulates around the spool 8, this spring, or these springs are compressed and carried down to the surface of the spool and the film slips upon itself to form a substantially tight or solid roll. This device is an improvement on that for a similar purpose set forth in my Patent No. 1,159,732, dated Nov. 9, 1915.

It is important that when the cover is in place there shall be no possibility of light entering the magazine. For this purpose an annular disk 20 is mounted in any suitable manner at a short distance above the inner face of the cover as shown in Fig. 3. A rotary member 21 having a peripheral groove embracing the edge of the annular disk 20 serves as a spindle which imparts rotation to the winding spool or as the bearing for the supply spool and while the end of this member 21 projects into or through an opening in the cover, the construction is such that the light is effectually shut off from the interior of the magazine.

In Fig. 3 the details of this device show a projection 22 which engages with and rotates the winding spool and the outer end of the member has depressions with which the rotary mechanism of the camera engages to impart the necesary movement.

As the film is wound on the winding spool, it is not always received in a manner that makes a roll with smooth sides so that in order to secure smoothly and evenly wound rolls of exposed film a light spring 23 is secured to the inner side of the cover, as shown in Fig. 6 and this bears on the edge of the entering exposed film and determines its position in the roll.

One of the most important characteristics of this invention resides in the feature that there are no sprocket wheels in the camera proper, as is usual in all other motion picture cameras, which generally have two and frequently more of these elements. In my device the number of sprockets is reduced to one, and this forms a part of the film magazine. This results in a great saving of time in reloading. The threading of the film, except its mere introduction into the gate, is an operation which is performed in the dark room, where time is not an element, and thus the time that would otherwise be involved in threading the film through the camera sprockets is eliminated. This is or may be a most important consideration when it becomes necessary to reload the camera or replace an exposed film in the field or in the trenches when such replacement must be done in the minimum of time to avoid missing valuable opportunities to take pictures.

An operator may carry with him a number of extras or loaded film magazines, as they are perfectly light proof and to withdraw one and insert another in the camera is the work of only a few seconds.

The character of the camera mechanism is or may be varied to any extent. I have devised special forms for use with the magazine herein shown and described, but as their functions and effects differ in no respect broadly from any others I have not illustrated them further than to indicate their relations to the magazine itself.

What I claim and desire to secure by the grant of Letters Patent is:

1. A detachable film magazine for motion picture cameras composed of a box or casing containing the film spools and feed sprocket and with a detachable cover or side, the said box being entirely closed and light proof except for an opening in front adapted to expose and to fit light tight over the continuously rotating film feed sprocket within the same.

2. A detachable film magazine for motion picture cameras composed of a light tight box or casing having an opening in front adapted to expose a portion of the continuously rotating film feed sprocket within the same, and pressure rolls mounted in the magazine casing with longitudinal grooves or teeth to engage with the teeth of the feed sprocket and form light tight joints therewith.

3. A detachable film magazine for motion picture cameras composed of a light tight box or casing containing the film spools and feed sprocket, with an opening in front to expose the continuously rotating film feed sprocket, spring seated pressure rolls mounted in the magazine casing for maintaining the film in engagement with the sprocket teeth, said rolls having longitudinal grooves or teeth at their ends to engage with the sprocket teeth and form light tight joints therewith.

4. In a film magazine for motion picture cameras, the combination with a supply spool, of a winding spool and a flat spring or springs secured at one end to the periphery of the winding spool and having its other end free, and adapted to be surrounded by the exposed film when the latter is received by the winding spool when rotated, thus forming under the action thereon of such film a winding surface of variable diameter.

5. In a film magazine for motion picture cameras, the combination with a box or casing having an opening exposing the continuously driven film feed sprocket roll, of idlers mounted in the magazine casing to direct the travel of a film around the feed sprocket, and a pivoted stop with which the end of the film when threaded around the feed sprocket engages after passing the last of the idlers and by which it is turned to close the passage over the surface of the feed sprocket and direct the end of the film.

6. In a film magazine for motion picture cameras, the combination with a box or casing of supply and winding spools, of a light spring secured to the wall of the casing in position to bear against the edge of the incoming exposed film and direct the same so that a roll with smooth and even sides will be formed on the winding spindle.

7. In a film magazine for motion picture cameras, the combination with a winding spool mounted on a spindle set in a box or casing, a detachable cover, an annular disk supported above the inner surface of the cover, a rotary member having overlapping frictional engagement with the inner edge of the annular disk to form a light tight joint, and means on said member for engaging with and imparting its rotation to the winding spool.

8. A film magazine for motion picture cameras composed of a light tight box or casing but having an opening in front to expose the continuously rotated film feeding sprocket within the same, in combination with boxes carried by the casing, springs forcing the same toward the axis of the feed sprocket and toothed rolls in said boxes engaging with the teeth of the feed sprocket and by the pressure of the springs forming tight joints to exclude light from the interior of the magazine casing.

In testimony whereof I hereunto affix my signature.

CARL E. AKELEY.